Dec. 19, 1961   F. H. MANN ET AL   3,014,175
ELECTRICAL LOGGING METHODS AND MEANS
Filed June 29, 1955   2 Sheets—Sheet 1
FIG.3.
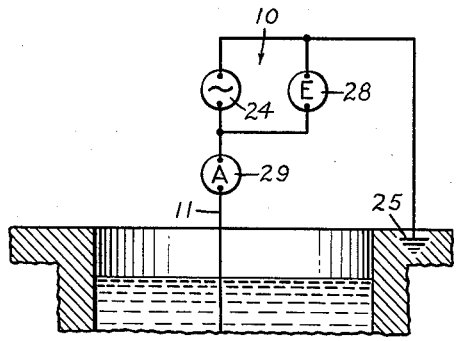
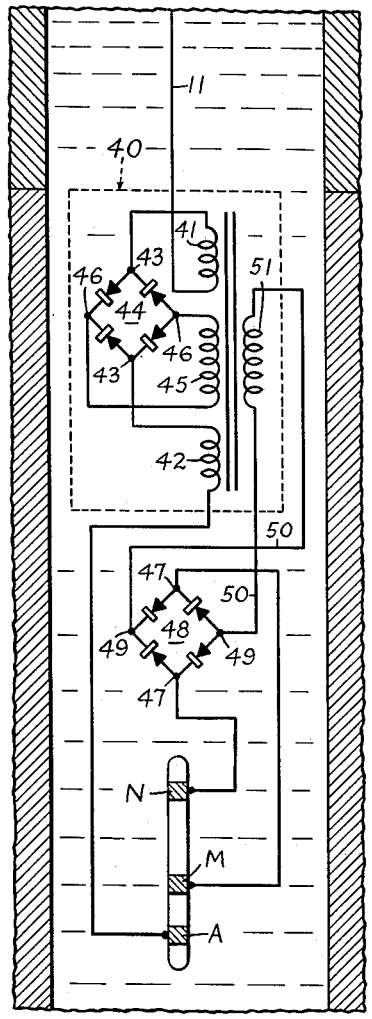
FIG.1.
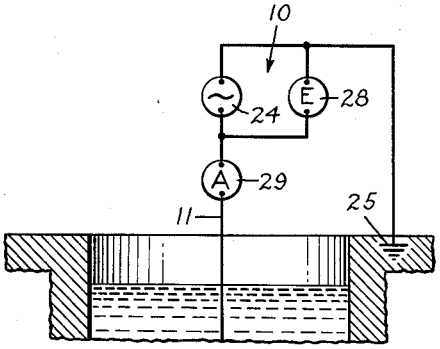
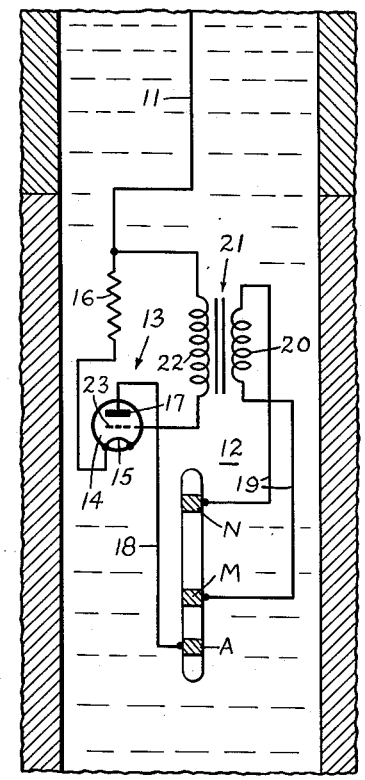
INVENTORS
Frederick Henry Mann
Daniel MacDougall
BY Campbell, Brumbaugh, Free & Graves
Their ATTORNEYS

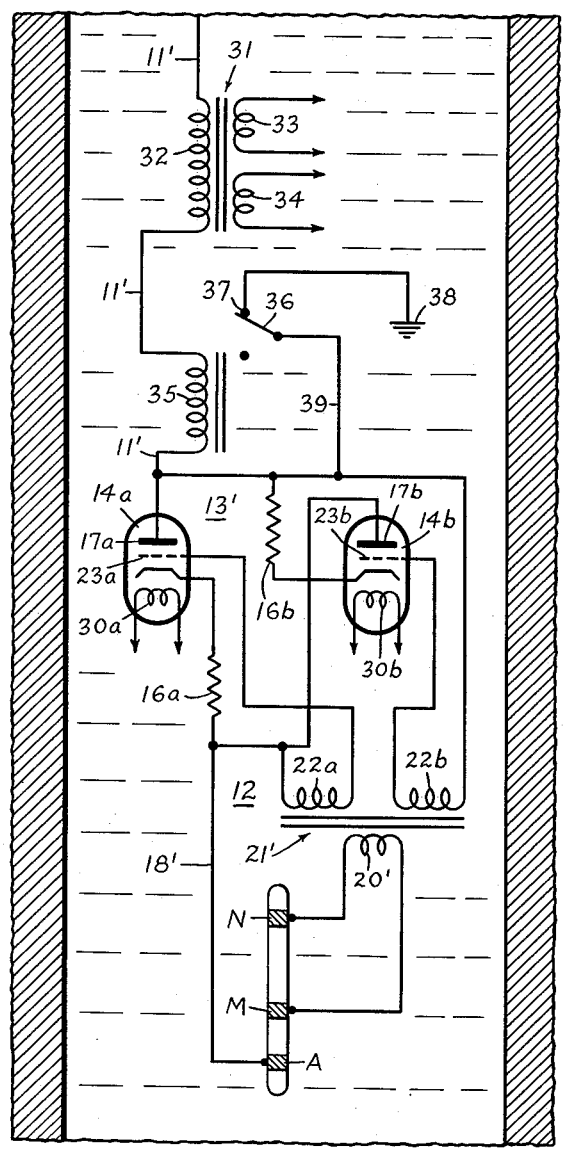

United States Patent Office 3,014,175
Patented Dec. 19, 1961

3,014,175
ELECTRICAL LOGGING METHODS AND MEANS
Frederick Henry Mann and Daniel MacDougall, Nottingham, England, assignors, by mesne assignments, to Schlumberger Well Surveying Corporation, Houston, Tex., a corporation of Texas
Filed June 29, 1955, Ser. No. 518,822
11 Claims. (Cl. 324—1)

This invention relates to the ascertainment of information about electrical variables e.g., electrical voltages, or impedances which can be represented as voltages, and is particularly concerned with the ascertainment of such information in inaccessible locations such as boreholes drilled into the earth.

During the search for petroleum, it is common practice to carry out electrical surveying of boreholes in order to secure information as to the nature and fluid content of the strata penetrated. Such information is useful for many purposes; for example, it assists in deciding at what depth the well casing should be set and perforated.

In carrying out such surveying or "logging" as it is called, the usual procedure is to place in the borehole a logging instrument (e.g., a resistivity logging sonde) which is supplied with electrical energy from the surface of the ground and which delivers an electrical signal varying in accordance with the parameter being measured. For this purpose, the borehole instrument may be suspended on a cable having as many as four conductors, two being used to supply power to the instrument and two to convey the signal from it to the surface where it can be observed and recorded. The use of a cable with several conductors is frequently awkward in practice since such a cable is heavy and cannot easily be run through a gland for pressure sealing as is necessary in boreholes producing a high pressure at the surface.

Several efforts have been made and described in the literature to overcome this difficulty by using a twin conductor cable or a single conductor cable with an earth return. These efforts have been based on the principle of sending power and signal in the same conductor in such a way that they can be separated electrically, e.g., by using one frequency for the power and another for the signal. Such devices tend to be complicated and require additional electrical equipment such as filters, frequency changers, and the like.

It is an object of the present invention accordingly to provide means for carrying out electrical logging in boreholes which uses only two conductors (one of which may be a ground return) between the borehole instrument and the surface of the earth without the need for complicated electrical equipment in the borehole.

Broadly stated, a method of obtaining indications of the magnitude of an electrical variable according to the invention comprises the steps of causing the variable to alter an impedance in an electrical circuit which is supplied with electrical energy whereby the amount of energy supplied to the circuit varies in accordance with variations in the magnitude of the variable, and obtaining indications of variations in the electrical energy supplied to the circuit.

More specifically, a method of logging boreholes according to the invention comprises providing a pair of conductors, one of which may be a ground return, between the surface of the earth and a borehole logging instrument, supplying electrical energy through the conductors to the logging instrument and to a variable impedance device connected between the conductors, feeding the output signal from the logging instrument to the variable impedance device so as to alter its impedance as a function of the magnitude of the signal, and obtaining indications at the surface of the earth of the resultant changes in the electrical energy being supplied down the borehole.

The invention also contemplates the provision of suitable apparatus for practicing the method of the invention, to be described in greater detail hereinafter.

Indications of variations in the value of the variable impedance device may be obtained either by observing variations in the current flowing in the circuit when the source voltage is maintained constant, or by noting how the source voltage varies when a constant current is flowing in the circuit.

The logging instrument and variable impedance device may be connected either in series or in parallel between the conductors. Also, the borehole logging instrument may be a four terminal measuring network or an electrical logging sonde.

The invention will now be described by way of example with reference to the accompanying drawings, in which:

FIG. 1 is a schematic diagram of a simplified form of borehole logging system using electron tube amplifier means as the variable impedance device;

FIG. 2 illustrates schematically another embodiment of the invention utilizing electron tubes; and FIG. 3 is a schematic diagram of a modified form of borehole logging system using a magnetic amplifier as the variable impedance device.

Referring first to FIG. 1, the well logging system comprises surface equipment 10 located at the surface of the earth and connected by a cable conductor 11 to borehole apparatus 12. The latter may include, for example, a conventional three electrode electrical logging system comprising a current emitting electrode A and longitudinally spaced apart potential pickup electrodes M and N.

Connected between the cable conductor 11 and the current emitting electrode A is an impedance device 13, the impedance of which is adapted to be adjusted in accordance with the potential difference appearing between the electrodes M and N, which is known to be a function of the electrical resistivity of the surrounding earth formations. The impedance device 13 may comprise a conventional triode 14 having a cathode 15 connected in series with a cathode biasing resistor 16 to the cable conductor 11 and an anode 17 connected by a conductor 18 to the current emitting electrode A of the electrical logging system.

The potential difference between the electrodes M and N is fed through the conductors 19 to the primary winding 20 of a step-up transformer 21. The secondary winding 22 of the transformer 21 has one terminal connected to the control grid 23 of the triode 14 and another terminal connected to the cathode resistor 16 where it joins the cable conductor 11.

The surface equipment 10 includes a constant current alternating current source 24 (e.g., a constant voltage generator in series with a large resistance), one terminal of which is connected to ground at 25 and the other terminal of which is connected to the upper end of the cable conductor 11. An indicating instrument 28 which is preferably a recording galvanometer, provides indications of the terminal voltage of the source 24 and a conventional current indicating instrument 29 indicates the current flowing in the cable conductor 11.

In operation, the alternating current source 24 is placed in operation. The borehole equipment 12 is then lowered into the borehole while alternating current of constant amplitude is supplied to the cable conductor 11. The current passing through the cable conductor 11 is subjected to half-wave rectification in the triode 14 so that successive half waves of current are emitted into the earth formations from the current electrode A, the return path to the ground 25 being through the intervening earth formations.

The passage of this current through the earth produces a corresponding potential difference between the electrodes M and N which is a function of the electrical resistivity of the formations in the vicinity of the electrode A. This potential difference is fed through the conductors 19 and the transformer 21 to the control grid 23 of the triode 14, so that it causes the plate impedance of the latter to vary in a corresponding manner. The cathode resistor 16 is preferably of the proper value to prevent the grid 23 from going positive. Since the current supplied by the source 24 is of constant amplitude, it will be understood that the terminal voltage of the source 24 and the reading of the indicating instrument 28 will vary substantially in accordance with variations in the impedance device 13. Therefore, the curve recorded by the instrument 28 will be representative of the electrical resistivity of the formations in the vicinity of the electrode array in the borehole.

In practice, conventional means may be provided for establishing a base line for the curve recorded by the instrument 28. For example, this may be done by introducing into the circuit of the recording instrument 28 a voltage exactly equal and opposite to the terminal voltage of the source 24 when the signal at the grid 23 of the triode 14 is zero.

While FIG. 1 illustrates a simple form of apparatus according to the invention, it is preferred to use the embodiment shown in FIG. 2 for logging the electrical resistivity of earth formations. In FIG. 2, the impedance device 13' comprises a pair of electron tubes 14a and 14b, the anode 17a of the triode 14a being connected to the junction point between the cable conductor 11' and the cathode resistor 16b, and the anode 17b of the triode 14b being connected to the junction between the conductor 18' and the cathode resistor 16a. It will be understood, therefore, that both positive and negative half waves of alternating current from the source at the surface will pass to the current emitting electrode A in the borehole.

The potential difference between the electrodes M and N is impressed on the primary winding 20' of a step-up transformer 21' having a pair of secondary windings 22a and 22b. The secondary winding 22b supplies a signal to the control grid 23b of the triode 14b, while the secondary winding 22a supplies a signal to the control grid 23a of the triode 14a. It will be apparent, therefore, that the impedance of the triodes 14a and 14b in parallel will vary as a function of the potential difference between the electrodes M and N which, in turn, is a function of the electrical resistivity of the surrounding formations.

If desired, the filaments 30a and 30b of the triodes 14a and 14b, respectively, may be energized from the secondary windings 33 and 34, respectively, of a transformer 31 having a primary winding 32 connected in series with the cable conductor 11'.

In order to permit the filaments 30a and 30b to warm up at reduced current, a relay 35 having a movable contact 36 normally engaging a fixed contact 37 may be connected in series with the cable conductor 11'. The fixed contact 37 may be connected to ground at the point 38, as shown, and the movable contact 36 may be connected by a conductor 39 to the upper end of the parallel circuit including the triodes 14a and 14b.

The relay 35 may be set to remain closed until the current passing through the cable conductor 11' is at least 80% of the value required in well logging operations. This allows the filaments 30a and 30b to warm up at reduced current, after which the current in the cable conductor 11' may be increased to its full value to open the relay 35, disengaging its contacts 36 and 37, and to bring the triodes 14a and 14b into operation.

The modification shown in FIG. 3 uses a magnetic amplifier 40 as a variable impedance device instead of the electron tube circuits shown in FIGS. 1 and 2. The magnetic amplifier 40 may be conventional and it may include a pair of A.C. windings 41 and 42 connected in series with one diagonal 43 of a conventional rectifier bridge 44. A feedback winding 45 is connected to the other diagonal 46 of the rectifier bridge 44. One end of the winding 42 is connected to the current emitting electrode A.

The potential difference between the electrodes M and N is connected to the diagonal 47 of another bridge type rectifier 48, the other diagonal 49 of which is connected by the conductors 50 to the D.C. control winding 51 of the magnetic amplifier 40.

It is well known that the impedance of the A.C. windings 41 and 42 of the magnetic amplifier 40 is a function of the amplitude of the D.C. flowing in the winding 51. Since the D.C. passing through the winding 51 is determined by the potential difference between the electrodes M and N, which, in turn, is a function of the electrical resistivity of the surrounding earth formations, the impedance represented by the magnetic amplifier 40 will also vary as a function of the formation resistivity.

The magnetic amplifier 40 should preferably be of the high gain type having positive feedback provided by the winding 45 and the rectifier bridge 44. In a practical case, the number of turns on the several windings may be as follows:

| | Turns |
|---|---|
| Control winding 51 | 5,000 |
| A.C. windings 41 and 42 | 500 |
| Feedback winding 45 | 490 |

A power gain of approximately 16,000 may be achieved with very little current drain in the control winding 51. The resultant change in the impedance of the A.C. circuit including the windings 41 and 42 can be readily detected at the surface by observing on the indicating instrument 28 variations in the terminal voltage of the source 24 while constant current flows through the cable conductor 11.

The invention thus provides novel well logging apparatus which is simple in construction, requires few components, and is lacking in critical adjustments. Further, it can be used with any desired frequency of alternating current and in combination with other equipment operated by alternating current of different frequency.

The magnetic amplifier embodiment of FIG. 3 requires no heater supplies and is more robust than the electron tube embodiments of FIGS. 1 and 2. The latter, on the other hand, puts less load on the measuring electrodes M and N than the magnetic amplifier apparatus.

It will be understood that other forms of electron tubes, such as diodes, triodes, pentodes, or even gas-filled tubes may be used in place of the triodes shown in FIGS. 1 and 2. In the case of a diode, the signal from the electrodes M and N may be caused to alter the cathode potential. The use of a germanium diode would be advantageous since it would avoid the necessity for a heater supply. Where electron tubes are used, the heaters may be energized by batteries lowered into the borehole with the logging equipment, instead of by A.C. in the manner shown in FIG. 2. Also, the resistivity logging sonde shown in FIGS. 1, 2 and 3 may be replaced by any other borehole logging instrument, e.g., a four terminal measuring network (such as a Wheatstone bridge) and the latter may be placed in parallel with the variable impedance device instead of in series with it. Therefore, the invention is not to be limited to the specific forms of apparatus shown but comprehends all modifications thereof falling within the scope of the appended claims.

What is claimed is:

1. Apparatus for providing indications at the surface of the earth of an output signal generated by a borehole logging instrument having electrical input means disposed in a borehole, comprising an energizing circuit for said instrument including a single energizing and signal carrying conductor extending from the surface of the earth to the logging instrument, a variable impedance device connected in said circuit within the instrument, said impedance device having an impedance characteristic determined by the signal applied to input means thereof, a source of current at the surface of the earth for supplying current along said single conductor to the variable impedance device and logging instrument, means for feeding an output signal of the logging instrument to the input means of the variable impedance device so as to alter the impedance of the latter in proportion to said output signal, and means for providing indications at the surface of the earth of changes in the electrical energy being supplied down the borehole resulting from changes in the impedance of said impedance device.

2. Apparatus according to claim 1, in which said energizing circuit is supplied from the surface of the earth with alternating current of constant amplitude whereby the voltage across the variable impedance device varies in accordance with the impedance of the device, and indicating means for providing indications representative of changes in said voltage at the surface of the earth.

3. Apparatus according to claim 1, in which said energizing circuit is supplied through a series resistance from a constant alternating voltage at the surface of the earth whereby the current through said variable impedance device varies in accordance with the impedance of the device, and indicating means at the surface for providing indications representative of variations in said current.

4. Apparatus according to claim 1, in which the logging instrument and variable impedance device are connected in series in said energizing circuit.

5. Apparatus according to claim 1, in which the logging instrument and variable impedance device are connected in parallel in said energizing circuit.

6. Apparatus according to claim 1, in which the variable impedance device comprises a unilaterally conducting device.

7. Apparatus according to claim 1, in which the variable impedance device comprises electron tube amplifier means.

8. Apparatus according to claim 1, in which the variable impedance device comprises amplifier means including a matched pair of electron tubes connected anode to cathode, and in which means is provided for passing the output signal of the logging instrument in opposite phase to the control electrodes of the two electron tubes.

9. Apparatus according to claim 1, in which the variable impedance device is magnetic amplifier means.

10. Apparatus according to claim 1, in which the borehole logging instrument is a four terminal measuring network.

11. Apparatus according to claim 1, in which the borehole logging instrument is an electrical logging sonde.

References Cited in the file of this patent

UNITED STATES PATENTS

| | | |
|---|---|---|
| 2,129,880 | Scherbatskoy et al. | Sept. 13, 1938 |
| 2,142,555 | Bowsky et al. | Jan. 3, 1939 |
| 2,142,619 | Sciaky | Jan. 3, 1939 |
| 2,508,478 | Uehling | May 23, 1950 |
| 2,527,170 | Williams | Oct. 24, 1950 |
| 2,597,088 | Dutilh | May 20, 1952 |
| 2,681,434 | Wheeler | June 15, 1954 |
| 2,772,395 | Runaldue | Nov. 27, 1956 |

FOREIGN PATENTS

| | | |
|---|---|---|
| 671,475 | Great Britain | May 7, 1952 |